(12) United States Patent
Dasher et al.

(10) Patent No.: US 8,484,687 B2
(45) Date of Patent: Jul. 9, 2013

(54) SYSTEM AND METHOD PROVIDING REMOTE VIDEO-ON-DEMAND (VOD)

(75) Inventors: Charles Dasher, Lawrenceville, GA (US); Bob Forsman, Sugar Hill, GA (US); Chris Phillips, Hartwell, GA (US)

(73) Assignee: Ericsson Television Inc., Duluth, GA (US)

( * ) Notice: Subject to any disclaimer, the term of this patent is extended or adjusted under 35 U.S.C. 154(b) by 200 days.

(21) Appl. No.: 13/088,887

(22) Filed: Apr. 18, 2011

(65) Prior Publication Data

US 2012/0266200 A1 Oct. 18, 2012

(51) Int. Cl.
*H04N 7/16* (2006.01)
*H04N 7/167* (2006.01)
*H04N 5/445* (2006.01)
*H04N 7/173* (2006.01)
*G06F 3/00* (2006.01)
*G06F 13/00* (2006.01)

(52) U.S. Cl.
USPC ........ 725/98; 725/1; 725/25; 725/27; 725/31; 725/37; 725/86; 725/87; 725/91; 725/93; 725/95; 725/104

(58) Field of Classification Search
USPC ............................................. 725/87
See application file for complete search history.

(56) References Cited

U.S. PATENT DOCUMENTS

2007/0240192 A1* 10/2007 Acharya et al. ................. 725/87
2008/0209491 A1* 8/2008 Hasek ........................... 725/114
2010/0017816 A1* 1/2010 Martini et al. .................. 725/31

* cited by examiner

Primary Examiner — Justin Shepard (57) ABSTRACT

A system and method enabling a user to view on a computing device, a catalog of Video On Demand (VOD) content available on a remote (guest) VOD system, to purchase an available piece of VOD content on the user's account in his Home VOD System, and to play the purchased piece of VOD content through a Guest Set Top Box (STB). A pairing process associates the computing device with the Guest STB, and a VOD Back Office stores this pairing. The VOD Back Office then builds a custom catalog of VOD content available to the user through the Guest STB and sends the catalog to the computing device. When the VOD Back Office receives a request from the computing device to view selected VOD content, the VOD Back Office sends an instruction to a Guest Headend Hub to set up a session with the Guest STB. The Hub force tunes the Guest STB and streams the selected VOD content to the Guest STB for display on a Guest television.

17 Claims, 8 Drawing Sheets

SYSTEM AND METHOD PROVIDING REMOTE VIDEO-ON-DEMAND (VOD)

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to television delivery systems. More particularly, and not by way of limitation, the present invention is directed to a system and method for providing Video On Demand (VOD) content at remote locations.

VOD systems allow users to purchase and consume multimedia content within their own Multiple System Operator (MSO)/cable system. This content is played out through a Set Top Box (STB) and television (TV) within the user's premises.

Within the realm of movie rental companies, product offerings such as Netflix enable a user to log in to his/her account from any geographic location to view a catalog of available movies and to add selected movies to the user's queue. For subscribers of cable TV services, this is not an option. Due to the nature of the STB customer premises equipment used for cable offerings, subscribers cannot view their subscription content or a catalog of available content on another piece of equipment.

U.S. Pat. No. 7,783,892 to Russell et al. describes a system for accessing portable media content subscription service privileges, and/or other privileged or protected content or resources. The Russell patent discloses a system for taking encrypted linear broadcast services such as HBO®, Showtime®, or XM Radio® broadcast feeds, which are encrypted with public and private keys, and playing those linear broadcast services on STBs other than the subscriber's STB. Normally, only encryption keys generated for the subscriber's STB are able to decrypt those broadcast linear services. The Russell patent generates public and private keys and then pairs those keys to other devices so they are not "hard wired" to only be used by the subscriber in his home. VOD, however, is not handled in the same way as linear broadcasts, and the Russell patent is not relevant to remote VOD services.

SUMMARY

The present invention enables a user utilizing a mobile computing device to view a catalog of VOD content available on a remote (guest) VOD system, to purchase an available piece of VOD content on the user's home account, and to play the purchased piece of VOD content through a guest STB.

In one embodiment, the present invention is directed to a method of providing VOD content to a subscriber through a Guest STB different from the subscriber's Home STB registered with the subscriber's Home VOD System, wherein the subscriber has access to a computing device for communicating with a VOD Back Office. The method includes the steps of associating the computing device with the Guest STB, wherein the VOD Back Office stores an association of a computing device identifier (ID) and a Guest STB equipment ID; sending from the VOD Back Office to the computing device, a catalog of VOD content for display on the computing device, wherein the catalog contains VOD content available to the subscriber for viewing through the Guest STB; and receiving by the VOD Back Office, a request from the computing device indicating the subscriber has entered a selection to view a selected piece of VOD content, the request including the computing device ID. The method also includes sending an instruction from the VOD Back Office to a Guest Headend Hub to set up a session with the Guest STB and force tune the Guest STB to a selected frequency, the Guest STB being identified through the stored association; and streaming the selected piece of VOD content on the selected frequency from the Guest Headend Hub to the Guest STB for display on a Guest television.

In another embodiment, the present invention is directed to a remote-delivery system for providing VOD content to a subscriber through a Guest STB different from the subscriber's Home STB registered with the subscriber's Home VOD System. The remote-delivery system includes a computing device having connectivity to a mobile wireless or Internet Protocol (IP) network, wherein a Remote VOD application is stored on and is executed by a processor in the computing device; a Guest Headend Hub serving the Guest STB; and a VOD Back Office having connectivity to the mobile wireless or IP network for communicating with the computing device, and having connectivity to the Guest Headend Hub. Wherein when the computing device executes the Remote VOD application, the computing device performs steps to cause the VOD Back Office to store an association between a computing device ID and a Guest STB equipment ID. Wherein, the VOD Back Office is adapted to send to the computing device, a custom catalog of VOD content for display on the computing device, wherein the catalog contains VOD content available to the subscriber for viewing through the Guest STB, and when the computing device receives a subscriber input selecting a piece of VOD content, the computing device is adapted to send a request for the selected VOD content to the VOD Back Office, the request including the computing device ID. Wherein, the VOD Back Office is adapted to send an instruction to the Guest Headend Hub to set up a session with the Guest STB associated with the computing device ID, and the Guest Headend Hub is adapted to force tune the Guest STB to a selected frequency and to stream the selected piece of VOD content on the selected frequency to the Guest STB for display on the Guest television.

In another embodiment, the invention is directed to a VOD Back Office for controlling remote-delivery of VOD content to a subscriber through a Guest STB different from the subscriber's Home STB registered with the subscriber's Home VOD System. The VOD Back Office has connectivity to a mobile wireless or IP network for communicating with a computing device located with the subscriber, and has connectivity to a Guest Headend Hub serving the Guest STB. The VOD Back Office includes a processor, and a non-transitory memory for storing computer program instructions. When the processor executes the computer program instructions, the processor causes the VOD Back Office to perform the steps of associating the computing device with the Guest STB, wherein the VOD Back Office stores an association of a computing device ID and a Guest STB equipment ID; and sending to the computing device, a catalog of VOD content for display on the computing device, wherein the catalog contains VOD content available to the subscriber for viewing through the Guest STB; receiving a request from the computing device indicating the subscriber has entered a selection to view a selected piece of VOD content, the request including the computing device ID; and sending an instruction to the Guest Headend Hub to set up a session with the Guest STB and to force tune the Guest STB to a selected frequency for streaming the selected piece of VOD content to the Guest STB, the Guest STB being identified through the stored association.

The present invention enables customers to feel more connected to a brand that they can take with them. The invention also enables others to be informed about VOD through word of mouth ad hoc demos (i.e., watching a VOD movie at a friend's house). It can increase VOD sales by creating a culture for customers where they feel like they "own" the content to which they subscribe.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention may be implemented in hardware or in a combination of hardware and software. For example, one or more computers or processors may perform the steps of the method of the present invention when executing computer program instructions stored in one or more non-transitory program memories.

Figure 1:
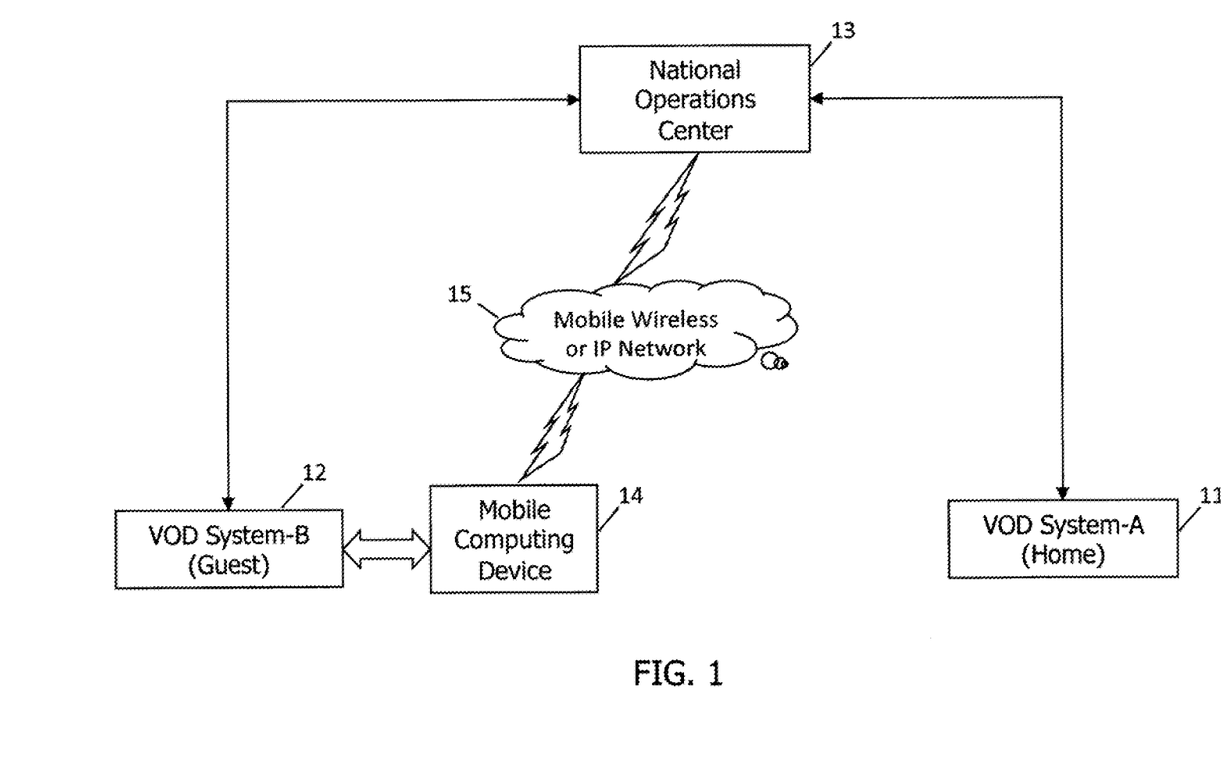
FIG. 1 is a simplified block diagram of a national VOD system in which a user has traveled from VOD System-A (home system) to VOD System-B (guest system)

FIG. 1 is a simplified block diagram of a national VOD system 10 in which a user has traveled from VOD System-A (home system) 11 to VOD System-B (guest system) 12. In an example scenario, the user has an account in the billing system on VOD System-A (home system) and travels to another city where the VOD System-B (guest system) is utilized. The national VOD system is configured in accordance with an exemplary embodiment of the present invention to create a custom VOD catalog based on subscriber and remote location information. VOD System-A and VOD System-B may communicate through a National Operations Center 13. The user has a mobile computing device 14, which communicates with the National Operations Center through a Mobile Wireless or IP Network 15. The mobile computing device is also paired with an STB in the VOD System-B as further described below.

Figure 2:
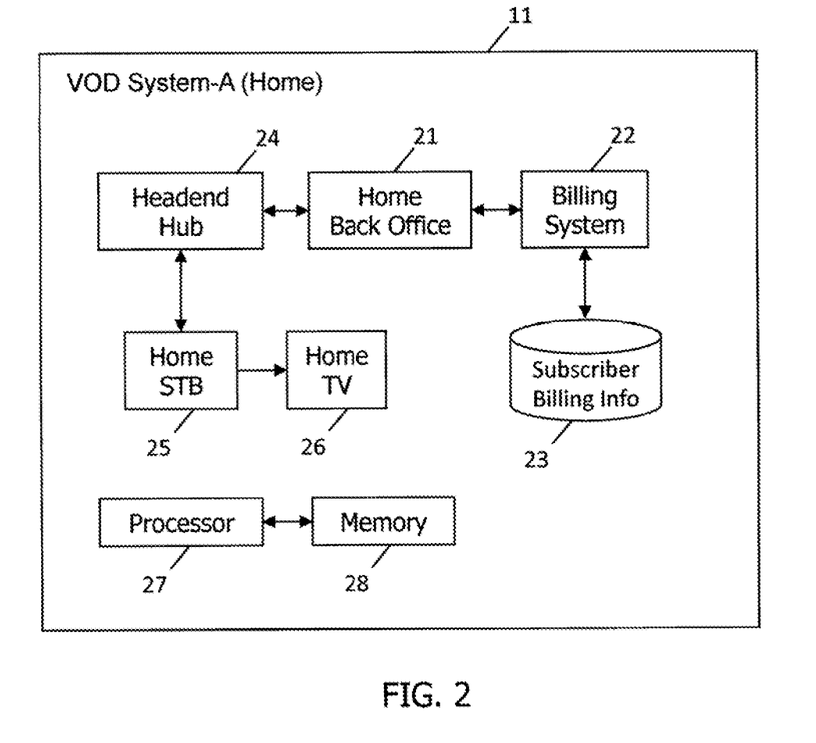
FIG. 2 is a simplified block diagram of the VOD System-A (home system) in an exemplary embodiment of the present invention.

FIG. 2 is a simplified block diagram of the VOD System-A (home system) 11 in an exemplary embodiment of the present invention. VOD System-A is shown to include a Home Back Office 21, which communicates with a Billing System 22. The Billing System stores information regarding the user's subscription and the user's billing information in a Subscriber Billing Information database 23. The Home Back Office also communicates with a Headend Hub 24, which streams VOD content to which the user subscribes to the user's Home STB 25 and his Home TV 26. The VOD System-A or individual components within the VOD System-A may include one or more computers or processors 27 and non-transitory program memories 28. Various nodes of the present invention may be implemented in hardware or in a combination of hardware and software in which the processors 27 may perform the steps of the method of the present invention when executing computer program instructions stored in one or more of the non-transitory program memories 28.

Figure 3:
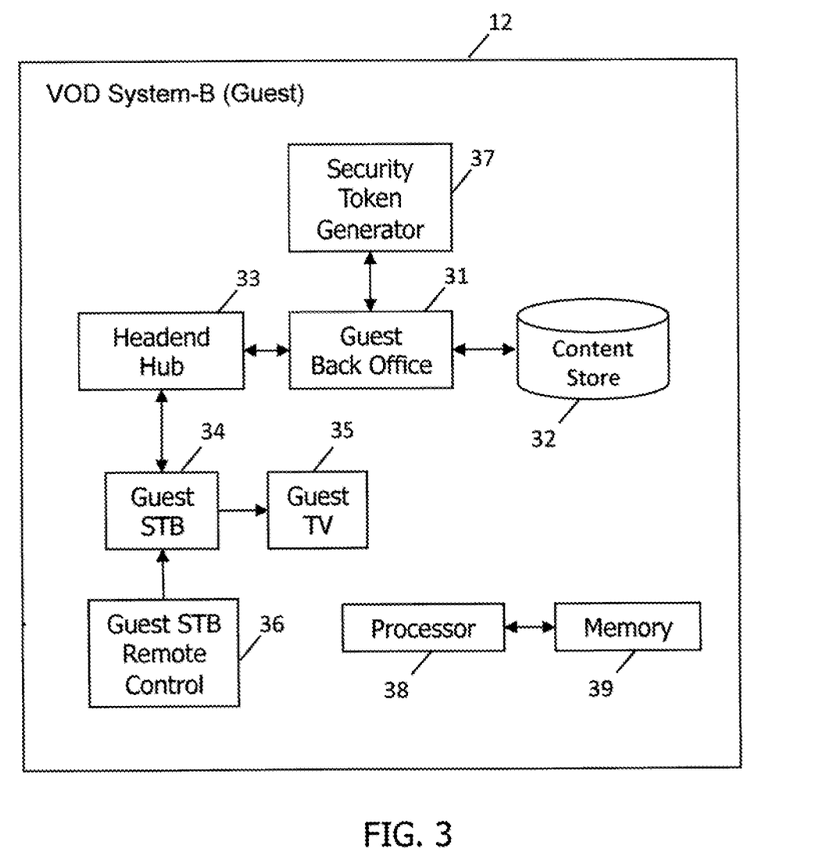
FIG. 3 is a simplified block diagram of the VOD System-B (guest system) in an exemplary embodiment of the present invention.

FIG. 3 is a simplified block diagram of the VOD System-B (guest system) 12 in an exemplary embodiment of the present invention. VOD System-B is shown to include a Guest Back Office 31, which communicates with a Content Store 32, which stores VOD content available through VOD System-B. The Guest Back Office also communicates with a Headend Hub 33, which streams VOD content to a Guest STB 34 and a Guest TV 35. A Guest STB Remote Control 36 may also be utilized during the process of pairing the user's mobile computing device 14 with the Guest STB 34. A Security Token Generator 37 generates a session-based security token when the user travels to VOD System-B and selects to watch VOD content, as described below in FIGS. 5A-5C. The VOD System-B or individual components within the VOD System-B may include one or more computers or processors 38 and non-transitory program memories 39 for controlling their operations.

Figure 4:
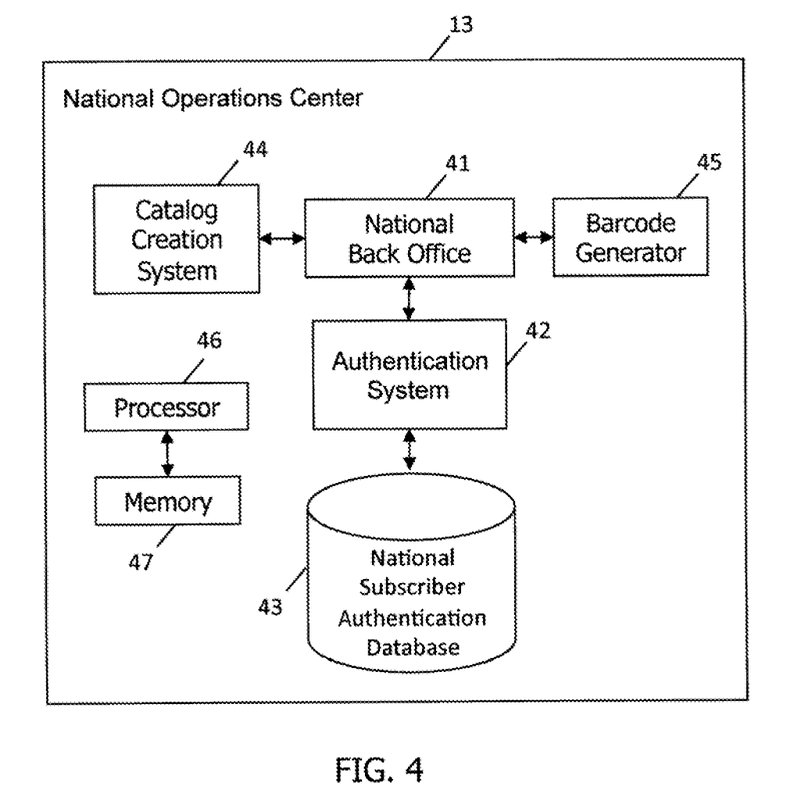
FIG. 4 is a simplified block diagram of a National Operations Center in an exemplary embodiment of the present invention.

FIG. 4 is a simplified block diagram of the National Operations Center 13 in an exemplary embodiment of the present invention. The National Operations Center 13 is shown to include a National Back Office 41, which includes a Subscriber Authentication System 42 and a National Subscriber Authentication Database 43. The National Back Office communicates with a Catalog Creation System 44 for creating customized subscriber/location-based catalogs of available VOD content. The National Back Office may also communicate with a Barcode Generator 45, which is utilized in one embodiment of the process of pairing the user's mobile computing device 14 with the Guest STB 34. The National Operations Center or individual components within the National Operations Center may include one or more computers or processors 46 and non-transitory program memories 47 for controlling their operations.

Figure 5A:
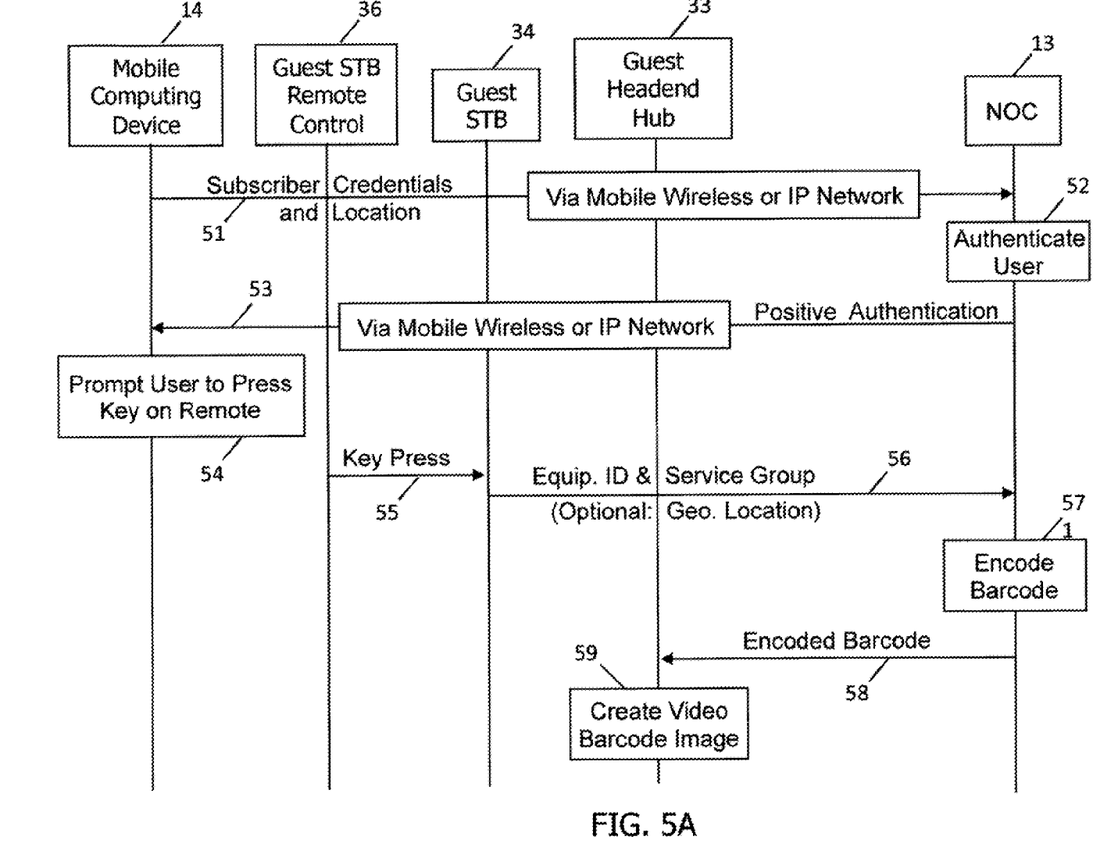
FIGS. 5A-5D are portions of a signal flow diagram illustrating an exemplary embodiment of the method of the present invention.

FIGS. 5A-5D are portions of a signal flow diagram illustrating an exemplary embodiment of the method of the present invention. Referring first to FIG. 5A, when the user with the account in the billing system on VOD System-A (home system) 11 travels to the city where the VOD System-B (guest system) 12 is utilized, the user initiates an application on his mobile computing device 14. The application determines the user's location for example through the Global Positioning System (GPS), through a positioning center in the local cellular network that uses triangulation from multiple base stations, or by IP address location when obtaining an IP address from a local Internet Service Provider (ISP). At step 51, the mobile computing device 14 sends the user's subscriber credentials and location information through, for example, the Mobile Wireless or IP Network 15 to the National Operations Center (NOC) 13. At step 52, the NOC uses the Subscriber Authentication System 42 to authenticate the user. At step 53, the NOC returns a positive authentication to the mobile computing device.

A process then begins to pair the mobile computing device 14 with the Guest STB 34. At step 54, the mobile computing device prompts the user to press a key on the Guest STB infrared remote control 36 that has been configured as a "pairing" key. At step 55, the user presses the pairing key and at step 56, a client application running on the Guest STB sends identifying information such as an Equipment ID and Service Group information for the Guest STB to the NOC 13. The NOC generates a code identifying the Guest Headend Hub 33 and Guest STB 34 and sends it via the Guest Headend Hub to the Guest STB for display on the Guest TV 35. Alternatively, at step 57, the NOC may use the centralized Barcode Generator 45 to encode the Equipment ID, Service Group, and any other identifying information into a barcode, which is sent at step 58 to the Guest Headend Hub. The Guest VOD System-B 12 may also accept the geographical location identifier when the guest system includes a number of headends or hubs. When the guest system includes a number of headends or hubs, a geographical location identifier may optionally be used along with the Equipment ID and Service Group to identify the particular headend or hub to which the Guest STB is connected. At step 59, the Guest Headend Hub processes the barcode into a format that can be displayed as an image on the Guest STB, for example a single IFrame MPEG file. The method then moves to FIG. 5B.

Figure 5B:
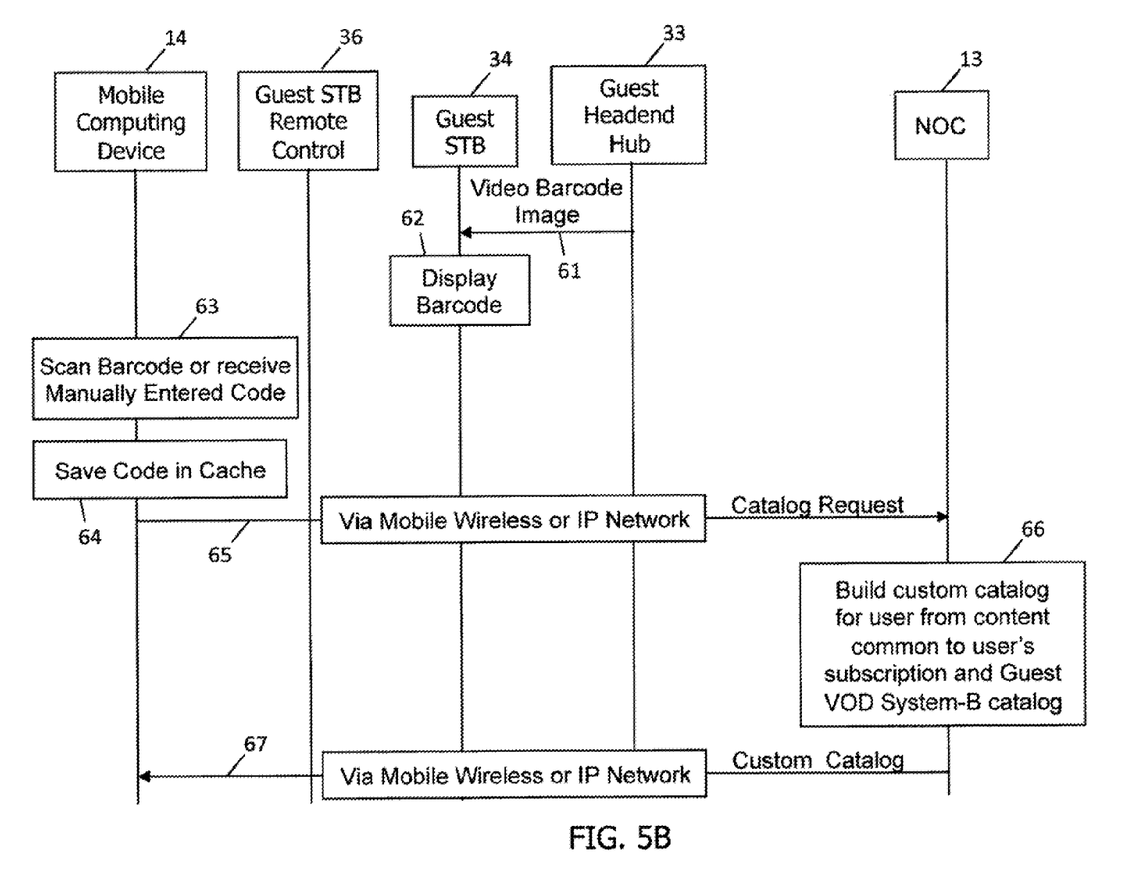

At step 61, the Guest Headend Hub 33 sends the video barcode image to the Guest SIB 34, and at step 62, the image is displayed on the Guest TV 35. At step 63, the mobile computing device is used to scan the barcode or to receive the manually entered code through a keypad, for example. At step 64, the code is saved in cache memory in the mobile computing device. The mobile computing device is now paired with the Guest VOD System-B 12. Upon pairing, the user's mobile computing device makes a request at step 65 to the NOC 13 for a VOD catalog of content available to him on the Guest VOD System-B. The request includes an identifier of the Guest STB 34 on which he wishes to play the content.

At step 66 the NOC 13 builds a custom VOD catalog for the user from VOD content common to the user's subscription in the Home VOD System-A 11 and the content store 32 of the Guest VOD System-B 12. Catalog generation/reconciliation parameters may be created based on the barcode identifier generated above, or may be derived from the geographical location of the device. Further, the NOC may determine the user's home back office system by analyzing the user's login credentials and authentication username. These parameters are sent to the NOC for catalog generation. The catalog generation process includes pulling the user's subscription from his home back office (billing), pulling the catalog from the guest back office system, and filtering the home subscription and guest catalog by determining items that are common to both.

The NOC 13 requests the user's subscription information from the Billing System 22 in the user's Home VOD System-A 11. The Billing System retrieves the subscription information from the database 23 and returns the information to the NOC. The NOC also requests VOD System-B 12 to report what VOD content 32 is available through VOD System-B. The Catalog Creation System 44 then reconciles the content to which the user subscribes on the user's Home VOD System-A with what is available on the Guest VOD System-B. Any VOD content to which the user subscribes and which is available on the Guest VOD System-B is included in a reconciled custom catalog of VOD content. Thus, for example, if the user subscribes to a premium service such as HBO® VOD in his Home VOD System-A, he is able to play HBO® VOD on the guest system if it is offered there, but he is not able to play VOD content from premium channels to which he does not subscribe. Additionally, if there are, for example, four movies available for HBO® VOD in his Home VOD System-A, but only two of those movies are available for HBO® VOD on the Guest VOD System-B, the catalog displayed on his mobile device would indicate only the two movies available on the Guest VOD System-B.

The custom catalog generation is not limited to available content at the user's geographical location, but may also be custom built based on the Subscription Video on Demand (SVOD) services to which the user subscribes. So, if the user subscribes to HBO® SVOD but not Showtime® SVOD, the reconciled catalog would include all titles available for display on the TV in the location the user is visiting for Movies on Demand (MOD) as well as content for the user's SVOD services. A user traveling from his home in Miami to Los Angeles, for example, would see HBO® VOD titles that are from the LA area (not his home Miami area) as well as all MOD content available from the LA area. The user would not see Showtime® VOD titles, for example, if he does subscribe to Showtime®.

At step 67, the NOC 13 sends the reconciled custom catalog to the user's mobile computing device where it is displayed for the user. The method then moves to FIG. 5C.

Figure 5C:
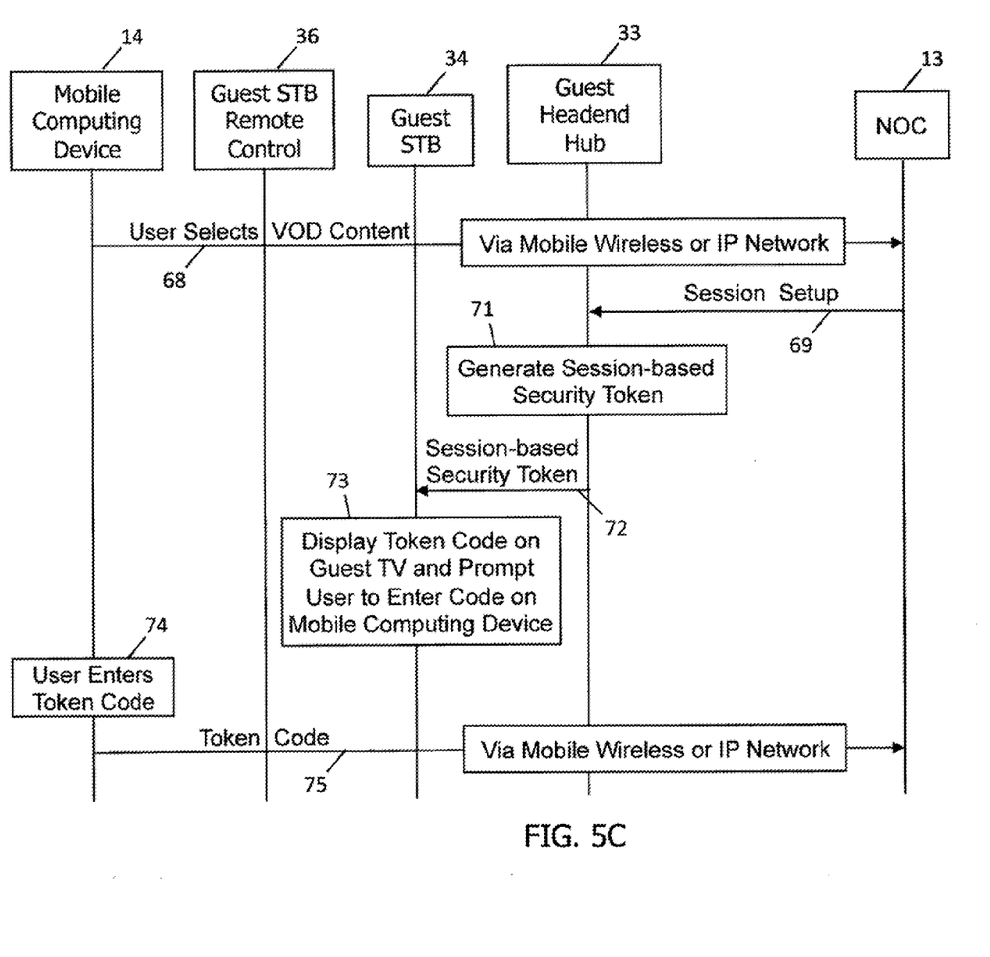

At step 68, the user chooses on his mobile computing device 14 to purchase a piece of VOD content such as a movie, and an indication of this selection is sent to the NOC 13. At step 69, the NOC sends a session setup command to the Guest Headend Hub 33. At step 71, the Guest Headend Hub recognizes this as a temporary pairing and the Security Token Generator 37 generates a temporary session-based security token. A temporary session-based security token is sent along with each request for stream control and is validated by the back office system or video pump. When the stream is "torn" down, the token is no longer valid and the session setup/token generation must be performed again in order to control a different movie.

At step 72, the Guest Headend Hub sends the session-based security token to the paired Guest STB 34, which displays a token code at step 73 on the Guest TV 35 and prompts the guest user to enter the token code on the user's paired mobile computing device. At step 74, the user enters the token code, and at step 75, the mobile computing device sends the token code to the NOC 13. The method then moves to FIG. 5D.

Figure 5D:
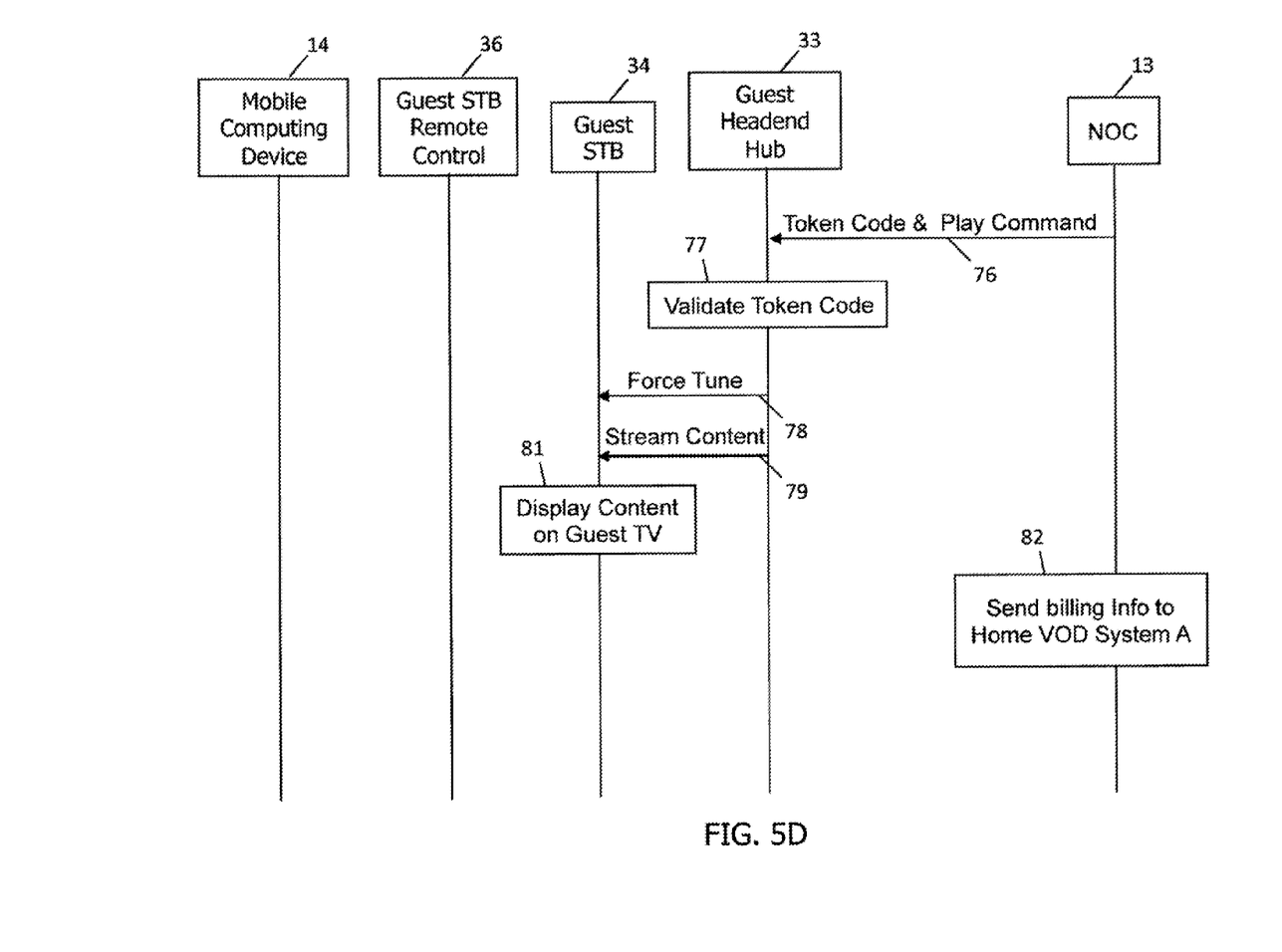

At step 76, the NOC 13 sends the token code and a play command to the Guest Headend Hub 33. At step 77, the Guest Headend Hub validates the token code and at step 78 broadcasts a Force Tune message with the Guest STB's equipment ID and a force tune frequency. This forces the Guest STB 34 to tune to the frequency/channel on which the selected VOD content is to be streamed. At step 79, the Guest Headend Hub streams the selected VOD content to the Guest STB, which at step 81, displays the content on the Guest TV 35.

Meanwhile, the NOC 13 sends billing information for the selected VOD content to the user's Home VOD System-A 11 so that the user is properly billed for the content.

Example Use Case:

1) Jim lives in Miami, Fla. where he is a cable subscriber with expanded and premium subscriptions.

2) His cable company is a national cable company with a footprint in many major cities in the US.

3) Jim visits friends in Los Angeles, Calif. Jim's friends are only expanded cable subscribers.

4) Jim decides he wants to watch HBO® on Demand on the television at his friend's house.

5) Jim gets his smart device and runs the Remote VOD application.

6) Jim's smart device has location determination capabilities using triangulation or GPS. It can also use IP address location when accessing the Internet through a local ISP.

7) Jim authenticates with the NOC and the NOC recognizes Jim is in his cable company's Los Angeles region.

8) Jim's smart device prompts him to press the pairing mode function/button on the Guest STB IR remote control.

9) The Guest STB sends its equipment ID and service group information to the NOC, which sends back a code or a barcode to be displayed on the Guest TV. The code uniquely identifies the Guest STB.

10) Jim sets the Remote VOD application in pairing mode and enters or scans the code into his smart device where it is saved in cache memory.

11) Jim's smart device is now paired with the Guest STB in Jim's friend's house and this association is known at the Los Angeles back office hub.

12) The NOC builds a custom catalog for Jim's device. The complete Los Angeles VOD catalog is sent to the NOC. The NOC also requests Jim's subscriber information from the Miami hub. (This information may also reside in a subscriber database at the NOC). Based on Jim's subscription information and the content available in Los Angeles, the NOC builds a custom catalog for Jim. The NOC sends the catalog to Jim's smart device where it is displayed.

13) Jim selects a VOD movie to play, and his smart device sends the selection to the NOC.

14) The NOC sends a session setup message for the selected VOD movie to the Los Angeles back office.

15) Since the Guest STB is not in Jim's subscriber database, the Los Angeles back office knows this is a temporary pairing.

16) The Los Angeles back office generates a session-based security token valid for this session only, and sends a security token code to the Guest STB that Jim's device is paired with.

17) The Guest STB displays the security token code on the Guest TV and prompts Jim to enter the code in his smart device.

18) Jim enters the code and selects OK.

19) Jim's smart device sends the code to the NOC.

20) The NOC sends the security token code and a play command to the Los Angeles back office.

21) The Los Angeles back office validates the security token code.

22) The Los Angeles back office broadcasts a force tune message with a force tune frequency and the equipment ID of the Guest STB.

23) The Guest STB tunes to the force tune frequency and a VOD pump at the Los Angeles hub streams the selected VOD movie on the force tune multicast/frequency.

24) The NOC sends billing information relating to the selected VOD movie to the Miami back office for billing Jim's home subscription.

It should be noted that the present invention may also operate within a single region of the cable company's service area. In other words, the user may simply travel to the home of a neighbor who also subscribes to services from the Home VOD System-A 11. By pairing his mobile computing device with his neighbor's STB, the user can request and watch premium VOD content to which he subscribes, on his neighbor's TV, even though his neighbor does not subscribe to the premium VOD content. The user is billed for the premium VOD content.

It should also be noted that in the embodiment described above, the computing device that is paired with the Guest STB is referred to as the subscriber's mobile computing device. Such a device may be a smartphone, a laptop or notebook computer, a Personal Digital Assistant (PDA), or other mobile device having the Remote VOD application stored thereon, and having connectivity to the mobile wireless or IP network 15. However, there is no requirement that the computing device actually belong to the subscriber or that it be mobile. As long as the computing device has connectivity to the mobile wireless or IP network and has the Remote VOD application stored thereon (or can download the Remote VOD application), it can perform the functions necessary for the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing Video On Demand (VOD) content to a subscriber through a Guest Set Top Box (STB) different from the subscribers Home STB registered with the subscriber's Home VOD System, wherein the subscriber has access to a computing device for communicating with a VOD Back Office, the method comprising the steps of:

associating the computing device with the Guest STB, wherein the VOD Back Office stores an association of a computing device identifier (ID) and a Guest STB equipment ID, and wherein the associating step includes:
   the computing device prompting the subscriber to press a designated key on the Guest STB or a Guest STB Remote Control,
   the Guest STB sending the Guest STB equipment ID to the VOD Back Office in response to the designated key being pressed,
   the VOD Back Office sending a code toward the Guest STB for display on a Guest television; and
   inputting the code into the computing device, wherein the code is utilized as the computing device ID in the association;

sending from the VOD Back Office to the computing device, a catalog of VOD content for display on the computing device, wherein the catalog contains VOD content available to the subscriber for viewing through the Guest STB;

receiving by the VOD Back Office, a request from the computing device indicating the subscriber has entered a selection to view a selected piece of VOD content, the request including the computing device ID;

sending an instruction from the VOD Back Office to a Guest Headend Hub to set up a session with the Guest STB and force tune the Guest STB to a selected frequency, the Guest STB being identified through the stored association; and streaming the selected piece of VOD content on the selected frequency from the Guest Headend Hub to the Guest STB for display on the Guest television.

2. The method according to claim 1, wherein the step of sending the catalog of available VOD content from the VOD Back Office to the computing device includes:

the VOD Back Office building a custom catalog for the subscriber by determining VOD content common to both the subscriber's subscription with the Home VOD System and a catalog of VOD content available in a Guest VOD System serving the Guest STB; and sending the custom catalog to the computing device.

3. The method according to claim 1, further comprising, after sending the instruction from the VOD Back Office to the Guest Headend Hub to set up the session with the Guest STB, the steps of:

the Guest Headend Hub generating a session-based security code and sending the security code to the Guest STB;

the Guest STB displaying the security code on the Guest television and prompting the subscriber to enter the displayed security code in the computing device;

the computing device sending the security code to the VOD Back Office; and the VOD Back Office sending a play command to the Guest Headend Hub only if the security code is properly received from the computing device.

4. The method according to claim 1, further comprising sending billing information for the selected piece of VOD content from the VOD Back Office to the subscriber's Home VOD System.

5. The method according to claim 1, wherein the VOD Back Office is at the subscriber's Home VOD System and the Guest STB is located within a service area of the Home VOD System.

6. The method according to claim 1, wherein the VOD Back Office is at a National Operations Center (NOC) and the Guest STB is located within a service area of a Guest VOD System located remotely from the Home VOD System.

7. The method according to claim 1, wherein the computing device is a mobile computing device having wireless connectivity to a mobile wireless or Internet Protocol (IP) network.

8. A remote-delivery system for providing Video On Demand (VOD) content to a subscriber through a Guest Set Top Box (STB) different from the subscriber's Home STB registered with the subscriber's Home VOD System, the remote-delivery system comprising:

a computing device having connectivity to a mobile wireless or Internet Protocol (IP) network, wherein a Remote VOD application is stored on and is executed by a processor in the computing device;

a Guest Headend Hub serving the Guest STB; and a VOD Back Office having connectivity to the mobile wireless or IP network for communicating with the computing device, and having connectivity to the Guest Headend Hub;

wherein when the computing device executes the Remote VOD application, the computing device performs steps to cause the VOD Back Office to store an association between a computing device identifier (ID) and a Guest STB equipment ID by performing the steps of:

the mobile computing device prompting the subscriber to press a designated key on the Guest STB or a Guest STB Remote Control;

the Guest STB sending the Guest STB equipment ID to the VOD Back Office in response to the designated key being pressed;

the VOD Back Office sending a code toward the Guest STB for display on the Guest television; and inputting the code into the subscriber's mobile computing device, wherein the code is utilized as the mobile computing device ID in the association;

wherein, the VOD Back Office is adapted to send to the computing device, a catalog of VOD content for display on the computing device, wherein the catalog contains VOD content available to the subscriber for viewing through the Guest STB;

wherein when the computing device receives a subscriber input selecting a piece of VOD content, the computing device is adapted to send a request for the selected VOD content to the VOD Back Office, the request including the computing device ID;

wherein, the VOD Back Office is adapted to send an instruction to the Guest Headend Hub to set up a session with the Guest STB associated with the computing device ID; and wherein the Guest Headend Hub is adapted to force tune the Guest STB to a selected frequency and to stream the selected piece of VOD content on the selected frequency to the Guest STB for display on the Guest television.

9. The remote-delivery system according to claim 8, wherein the VOD Back Office is adapted to build a custom catalog for the subscriber by including only VOD content common to both the subscriber's subscription with the Home VOD System and a catalog of VOD content available in a Guest VOD System serving the Guest STB.

10. The remote-delivery system according to claim 8, wherein, when the VOD Back Office sends the instruction to the Guest Headend Hub to set up the session with the Guest STB:

the Guest Headend Hub is adapted to generate a session-based security code and to send the security code to the Guest STB;

the Guest STB is adapted to display the security code on the Guest television and to prompt the subscriber to enter the displayed security code in the computing device;

the computing device is adapted to send the security code to the VOD Back Office; and the VOD Back Office is adapted to send a play command to the Guest Headend Hub only if the security code is properly received from the computing device.

11. The remote-delivery system according to claim 8, wherein the VOD Back Office is also adapted to send billing information for the selected piece of VOD content to the subscriber's Home VOD System.

12. The remote-delivery system according to claim 8, wherein the VOD Back Office is at the subscriber's Home VOD System and the Guest STB is located within a service area of the Home VOD System.

13. The remote-delivery system according to claim 8, wherein the VOD Back Office is at a National Operations Center (NOC) and the Guest STB is located within a service area of a Guest VOD System located remotely from the Home VOD System.

14. The remote-delivery system according to claim 8, wherein the computing device is a mobile computing device having wireless connectivity to the mobile wireless or IP network.

15. A Video On Demand (VOD) Back Office for controlling remote-delivery of VOD content to a subscriber through a Guest Set Top Box (STB) different from the subscriber's Home STB registered with the subscriber's Home VOD System, wherein the VOD Back Office has connectivity to a mobile wireless or IP network for communicating with a computing device located with the subscriber, and has connectivity to a Guest Headend Hub serving the Guest STB, wherein the VOD Back Office comprises:

a processor; and a non-transitory memory for storing computer program instructions;

wherein when the processor executes the computer program instructions, the processor causes the VOD Back Office to perform the steps of:

associating the computing device with the Guest STB, wherein the VOD Back Office stores an association of a computing device identifier (ID) and a Guest STB equipment ID, and wherein the associating step includes:

receiving from the Guest STB, the Guest STB equipment ID in response to the subscriber pressing a designated key on the Guest STB or a Guest STB Remote Control; and sending a code toward the Guest STB for display on a Guest television, wherein when the code is input into the computing device, the code is utilized as the computing device ID in the association;

sending to the computing device, a catalog of VOD content for display on the computing device, wherein the catalog contains VOD content available to the subscriber for viewing through the Guest STB;

receiving a request from the computing device indicating the subscriber has entered a selection to view a selected piece of VOD content, the request including the computing device ID; and sending an instruction to the Guest Headend Hub to set up a session with the Guest STB and to force tune the Guest STB to a selected frequency for streaming the selected piece of VOD content to the Guest STB, the Guest STB being identified through the stored association.

16. The VOD Back Office according to claim 15, wherein the VOD Back Office is adapted to build a custom catalog for the subscriber by including only VOD content common to both the subscriber's subscription with the Home VOD System and a catalog of VOD content available in a Guest VOD System serving the Guest STB.

17. The VOD Back Office according to claim 15, wherein after sending the instruction to the Guest Headend Hub to set up the session with the Guest STB, the VOD Back Office is configured to:

receive a session-based security code from the computing device in response to entry of the security code in the computing device by the subscriber, wherein the session-based security code is generated by the Guest Headend Hub and sent to the Guest STB for display on the Guest television with a prompt for the subscriber to enter the displayed security code in the computing device; and send a play command to the Guest Headend Hub only if the security code is properly received from the computing device.

\* \* \* \* \*